United States Patent
Oda (10) Patent No.: US 12,208,405 B2
(45) Date of Patent: Jan. 28, 2025

(54) PROCESSING SYSTEM, PROCESSING METHOD, AND STORAGE MEDIUM

(71) Applicant: KABUSHIKI KAISHA TOSHIBA, Tokyo (JP)

(72) Inventor: Tatsuhiro Oda, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 635 days.

(21) Appl. No.: 17/016,925

(22) Filed: Sep. 10, 2020

(65) Prior Publication Data

US 2021/0086214 A1 Mar. 25, 2021

(30) Foreign Application Priority Data

Sep. 24, 2019 (JP) .................. 2019-172931

(51) Int. Cl.
*G01N 15/00* (2024.01)
*B05B 1/30* (2006.01)
(Continued)

(52) U.S. Cl.
CPC .............. *B05B 12/006* (2013.01); *B05B 1/30* (2013.01); *B05B 1/3405* (2013.01); *G01N 11/04* (2013.01);
(Continued)

(58) Field of Classification Search
CPC .................. G01N 11/04; G01N 15/00; G01N 2015/0003; G01N 2015/0026; G01N 2015/004; G06N 3/08
See application file for complete search history.

(56) References Cited

U.S. PATENT DOCUMENTS

2009/0155461 A1* 6/2009 Jabado .................. F01D 5/288
427/180
2017/0276527 A1* 9/2017 Chen .................. G01F 1/6965

FOREIGN PATENT DOCUMENTS

JP 2001-348659 A 12/2001
JP 2004-277852 A 10/2004
(Continued)

OTHER PUBLICATIONS

Nelms, David Martin. System innovations for aerosol MOCVD of YBCO superconducting thin films. University of Arkansas, 1997. (Year: 1997).*

(Continued)

*Primary Examiner* — Kristina M Deherrera
*Assistant Examiner* — Fatemeh Esfandiari Nia
(74) *Attorney, Agent, or Firm* — Oblon, McClelland, Maier & Neustadt, L.L.P.

(57) ABSTRACT

According to one embodiment, a processing system includes a chamber, a supplier, a detector, and a controller. The chamber is configured to store a processing object inside. The supplier is configured to supply a plurality of particles and a gas inside the chamber. The detector is configured to detect a state of air flow in a vicinity of the processing object. The controller is configured to control the supplier based on a detection value from the detector. The controller determines generation of a vortex based on data regarding a steady state of the air flow and the detection value from the detector, and controls the supplier to stop supply of the plurality of particles when the generation of the vortex is determined.

20 Claims, 3 Drawing Sheets

(51) Int. Cl.
 B05B 1/34 (2006.01)
 B05B 12/00 (2018.01)
 G01N 11/04 (2006.01)
 G06N 3/08 (2023.01)

(52) U.S. Cl.
 CPC ............... G01N 15/00 (2013.01); G06N 3/08 (2013.01); *G01N 2015/0003* (2013.01); *G01N 2015/0026* (2013.01); *G01N 2015/0046* (2013.01)

(56) References Cited

FOREIGN PATENT DOCUMENTS

JP  2006-82023 A  3/2006
JP  5029864 B2 *  9/2012

OTHER PUBLICATIONS

JP-5029864-B2-Translate (Year: 2006).*

* cited by examiner

PROCESSING SYSTEM, PROCESSING METHOD, AND STORAGE MEDIUM

CROSS-REFERENCE TO RELATED APPLICATIONS

This application is based upon and claims the benefit of priority from Japanese Patent Application No. 2019-172931, filed on Sep. 24, 2019; the entire contents of which are incorporated herein by reference.

FIELD

Embodiments described herein relate generally to a processing system, a processing method, and a storage medium.

BACKGROUND

There is a technique of jetting a gas (aerosol) including a plurality of particles onto a surface of a substrate or the like to form a film using the plurality of particles or the like on the surface of the substrate. Further, a technique has also been proposed in which the concentration of the plurality of particles included in the aerosol is measured and feedback control is performed so that the concentration of the plurality of particles included in the aerosol becomes substantially constant. Generally, such film formation is performed inside the chamber.

Here, when the supply amount or flow velocity of the aerosol supplied to the inside of the chamber changes, a vortex may be generated in an air flow. When a vortex is generated in the air flow, even if the concentration of particles included in the aerosol is made substantially constant, a deposition amount of particles, and hence a thickness of the film formed is different below the region where the vortex is generated and below the region where the vortex is not generated.

Therefore, there was a demand for the development of a technology that can achieve a uniform film thickness.

DETAILED DESCRIPTION

According to one embodiment, a processing system includes a chamber, a supplier, a detector, and a controller. The chamber is configured to store a processing object inside. The supplier is configured to supply a plurality of particles and a gas inside the chamber. The detector is configured to detect a state of air flow in a vicinity of the processing object. The controller is configured to control the supplier based on a detection value from the detector. The controller determines generation of a vortex based on data regarding a steady state of the air flow and the detection value from the detector, and controls the supplier to stop supply of the plurality of particles when the generation of the vortex is determined.

Various embodiments are described below with reference to the accompanying drawings.

In the specification and drawings, components similar to those described previously or illustrated in an antecedent drawing are marked with like reference numerals, and a detailed description is omitted as appropriate.

A processing system 1 according to the embodiment is able to form a film by generating an aerosol, supplying the generated aerosol toward a processing object, and depositing a plurality of particles included in the aerosol on the surface of the processing object. In the specification, the aerosol can be a gas including a plurality of particles.

In this case, the particles can be solid or liquid. In the following, the case where the particles are solid will be described as an example. The material of the solid particles is not particularly limited, and examples thereof include carbon, ceramics, and a metal such as platinum. The size of the solid particles is not particularly limited, but the particle size can be set to 1 μm or less, for example.

Figure 1:
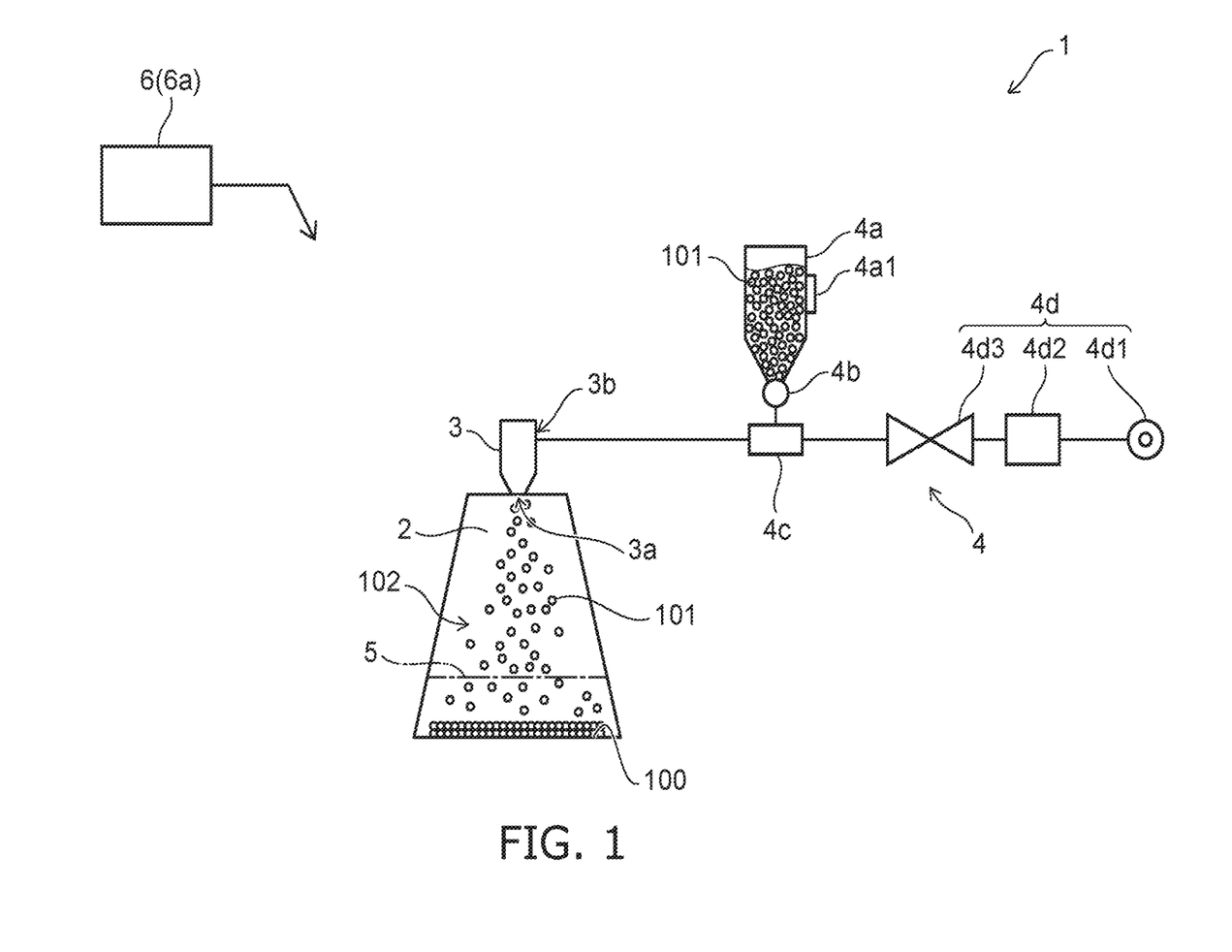
FIG. 1 is a schematic view for illustrating a processing system according to the embodiment.

FIG. 1 is a schematic view for illustrating a processing system 1 according to the embodiment.

As shown in FIG. 1, the processing system 1 can be provided with a chamber 2, a nozzle 3, an aerosol supplier 4, a detector 5, and a controller 6.

The chamber 2 has a box shape and can have an airtight structure to the extent that dust does not enter from the outside. The internal space of the chamber 2 is a region where a film is formed on the surface of a processing object 100 by using the aerosol 102. In this case, an air flow is formed inside the chamber 2.

As will be described later, when a vortex 103 is generated in the air flow, the deposition amount of particles, and hence the thickness of the formed film, is different below the region where the vortex 103 is generated and below the region where the vortex 103 is not generated. Therefore, it is preferable that the chamber 2 is shaped so that the turbulence of the air flow is reduced. For example, it is preferable that the cross-sectional dimension of the chamber 2 (the dimension in the direction perpendicular to the direction from the nozzle 3 to the region on which the processing object 100 is placed) gradually increases as it approaches the region on which the processing object 100 is placed. For example, the appearance shape of the chamber 2 can be a truncated pyramid or a truncated cone. In this case, as shown in FIG. 1, if the appearance shape of the chamber 2 is a truncated cone, the distance from the center of the processing object 100 to the inner wall of the chamber 2 can be made substantially constant. Therefore, it is easy to make the influence of the inner wall of the chamber 2 on the air flow uniform.

The processing object 100 for film formation can be stored inside the chamber 2. For example, the processing object 100 can be placed on a bottom surface of the chamber 2 or on a placement table provided on the bottom surface of the chamber 2. When providing the placement table, a holding device such as an electrostatic chuck can be provided on the placement table. Further, the placement table may be movable in a horizontal direction, a vertical direction, or the like.

There is no particular limitation on the material, shape, size, etc. of the processing object 100. For example, as illustrated in FIG. 1, the shape of the processing object 100 may be a plate shape, that is, the processing object 100 may be a substrate or the like.

The nozzle 3 has a tubular shape, and a discharge port 3a for discharging the aerosol 102 can be provided at one end. An inlet 3b for introducing the aerosol 102 can be provided on the other end side of the nozzle 3. The nozzle 3 can be provided on the ceiling surface of the chamber 2, for example. The nozzle 3 can be provided so that the discharge port 3a faces the processing object 100. Although the case where the nozzle 3 is provided on the ceiling surface of the chamber 2 has been illustrated, the attachment position of the nozzle 3 can be appropriately changed as long as the discharge port 3a faces the processing object 100. For example, the nozzle 3 may be provided on a side surface of the chamber 2 or may be provided inside the chamber 2.

The aerosol supplier 4 can generate the aerosol 102. Further, the aerosol supplier 4 can supply the generated aerosol 102 into the chamber 2 via the nozzle 3. That is, the aerosol supplier 4 can supply a plurality of particles 101 and a gas into the chamber 2.

The aerosol supplier 4 can include a container 4a, a supply controller 4b, a mixer 4c, and a gas supplier 4d.

The container 4a can be connected to the mixer 4c via the supply controller 4b. The container 4a has a tubular shape and can store the plurality of particles 101 described above inside. The container 4a can send the stored plurality of particles 101 to the supply controller 4b by using gravity, for example.

Further, the vibrator 4a1 may be provided on an outer surface of the container 4a. The vibrator 4a1 can give kinetic energy to the plurality of particles 101 stored inside the container 4a by ultrasonic vibration, electromagnetic vibration, mechanical vibration, or the like. The vibrator 4a1 is not always necessary, and may be appropriately provided according to the shape and size of the plurality of particles 101. However, if the vibrator 4a1 is provided, supply control of the plurality of particles 101 to the supply controller 4b can be stabilized.

The supply controller 4b can control the supply amount of the plurality of particles 101 from the container 4a to the mixer 4c, and can control the start and stop of the supply of the plurality of particles 101. For example, the supply controller 4b can change the size of the holes through which the plurality of particles 101 pass.

The mixer 4c can be provided between the gas supplier 4d and the nozzle 3. The mixer 4c can mix the plurality of particles 101 supplied from the supply controller 4b and the gas supplied from the gas supplier 4d to generate the aerosol 102. For example, the mixer 4c can generate the aerosol 102 by introducing a predetermined amount of the particles 101 supplied from the supply controller 4b into the flow of the gas supplied from the gas supplier 4d. In this case, the Venturi effect can be used to draw the plurality of particles 101 into the gas flow. The aerosol 102 generated by the mixer 4c is introduced into the chamber 2 via the nozzle 3.

Although the above is the case of the solid particles 101, the aerosol can be similarly generated in the case of the liquid particles. For example, the liquid may be stored in the container 4a, and the Venturi effect may be used in the mixer 4c to atomize the liquid and draw the liquid into the gas flow.

The gas supplier 4d can supply a predetermined flow rate of gas to the mixer 4c. The gas is not particularly limited as long as it is difficult to react with the processing object 100 and the particles 101. The gas can be, for example, an inert gas such as helium gas or argon gas, nitrogen gas, or air.

The gas supplier 4d can have a gas source 4d1, a flow rate controller 4d2, and an open/close valve 4d3.

The gas source 4d1 can supply the gas to the flow rate controller 4d2. The gas source 4d1 can be, for example, a cylinder containing a high-pressure gas, a factory pipe for supplying a gas, or the like.

The flow rate controller 4d2 can control the flow rate of the gas supplied to the mixer 4c. The flow rate controller 4d2 can be, for example, an MFC (Mass Flow Controller) or the like. The flow rate controller 4d2 may indirectly control the flow rate of gas by controlling the gas supply pressure. In this case, the flow rate controller 4d2 can be, for example, an APC (Auto Pressure Controller) or the like.

The open/close valve 4d3 can switch between starting the supply of gas and stopping the supply of gas. The open/close valve 4d3 can be, for example, a two-way valve or the like. If the flow rate controller 4d2 has a function of switching between starting the supply of gas and stopping the supply of gas, the open/close valve 4d3 can be omitted.

The detector 5 can detect the state of the air flow in the vicinity of the region on which the processing object 100 is placed inside the chamber 2. The detector 5 is provided outside the chamber 2, for example, and can detect the state of the air flow through a window provided on the side surface of the chamber 2. The window provided on the side surface of the chamber 2 can be formed of a translucent material such as glass.

Figure 2:
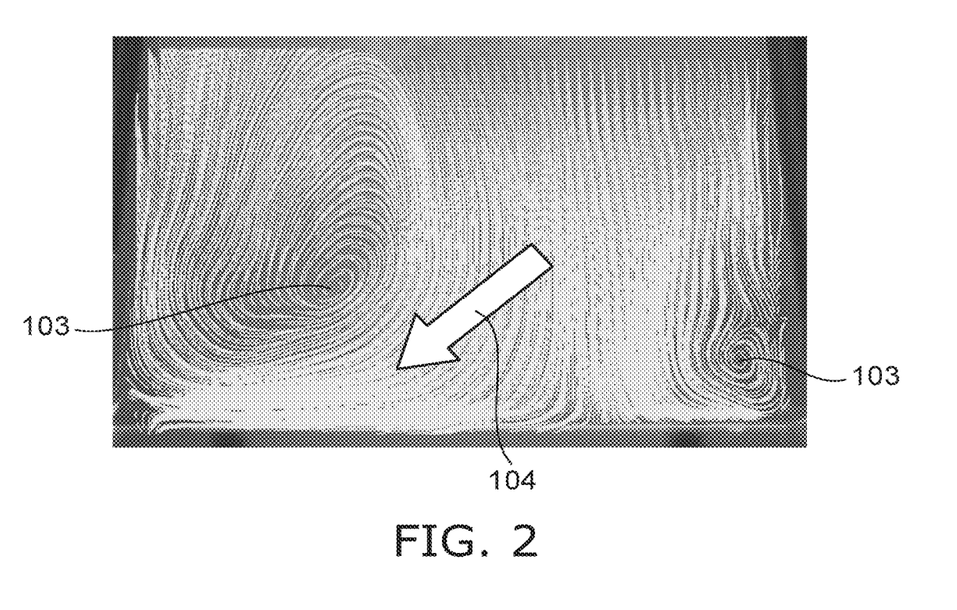
FIG. 2 is a schematic view for illustrating a vortex.

The detector 5 can directly detect a state of the air flow by detecting the flow velocity of the aerosol 102, for example. In this case, the detector 5 can be, for example, a flow velocity meter or a flow meter. In addition, the detector 5 can indirectly detect the state of the air flow by detecting the behavior of the plurality of particles 101 included in the aerosol 102. The behavior of the plurality of particles 101 can be obtained by changing the number of particles 101 or changing the concentration. In this case, the detector 5 can be, for example, a particle counter or the like.

The controller 6 may include an arithmetic part 6a such as a CPU (Central Processing Unit) and a memory part such as a memory. The controller 6 can be, for example, a computer or the like. The memory part can store the processing program according to the embodiment. Further, the memory part can store the above-mentioned data regarding the steady state of the air flow. The controller 6 can control the operation of each element provided in the processing system 1 based on the processing program stored in the memory part and the data regarding the steady state of the air flow. For example, the controller 6 can control the aerosol supplier 4 based on the detection value from the detector 5. For example, the controller 6 can control the aerosol supplier 4 to deposit the plurality of particles 101 on the surface of the processing object 100 to form a film.

Here, the data regarding the steady state of the air flow will be described.

The state of the air flow inside the chamber 2 may change irregularly. For example, when the flow rate or flow velocity of the aerosol 102 supplied inside the chamber 2 changes, the state of the air flow inside the chamber 2 changes irregularly. When the state of the air flow changes, the vortex 103 is likely to be generated in the air flow. Further, if the flow rate of the aerosol 102 is increased or the flow velocity of the aerosol 102 is increased in order to improve productivity, the vortex 103 is more likely to be generated.

FIG. 2 is a schematic view for illustrating the vortex 103.

As shown in FIG. 2, when the vortex 103 is generated, the streamline 104 of the air flow becomes lateral around the vortex 103. Therefore, even if the concentration of the particles 101 included in the aerosol 102 is made substantially constant, the deposition amount of particles, and hence the thickness of the film formed is different below the region where the vortex 103 is generated and below the region where the vortex 103 is not generated. That is, an in-plane distribution occurs in the thickness of the formed film.

The generation timing of the vortex 103, the generation place of the vortex 103, and the behavior of the generated vortex 103 change irregularly. That is, it is difficult to eliminate the generation of the vortex 103, predict the generation time of the vortex 103, the generation place of the vortex 103, and the behavior of the generated vortex 103 routinely. In addition, even if a member for suppressing the generation of the vortex 103 is provided inside the chamber 2 or a condition for suppressing the generation of the vortex 103 is obtained by an experiment or the like, if the film forming condition (for example, the flow rate of the aerosol 102 or the flow velocity, the size, the material, the concentration, etc. of the particles 101) changes, the generation of the vortex 103 cannot be suppressed.

Therefore, in the processing system 1 according to the embodiment, experiments and simulations are performed to determine the steady state of the air flow in the vicinity of the region where the processing object 100 is placed inside the chamber 2 (the state in which the vortex 103 is not generated).

Figure 3:
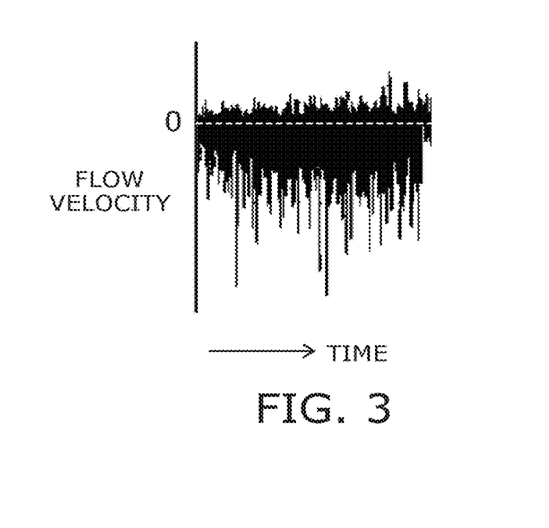
FIG. 3 is a graph view for illustrating a steady state of an air flow.

FIG. 3 is a graph view for illustrating the steady state of the air flow.

FIG. 3 exemplifies a change in the flow velocity of the air flow in the vicinity of the region on which the processing object 100 is placed. The direction of the flow velocity (flow direction) is opposite between the upper side and the lower side of the vertical axis. As can be seen from FIG. 3, if the vortex 103 is not generated, the direction of the flow velocity is almost constant, and the flow velocity values are about the same. Therefore, such a state can be referred to as a "steady state". For example, if an experiment or simulation is performed for each film forming condition, it is possible to obtain steady-state data of the air flow corresponding to the film forming condition. The steady-state data may be obtained at any time by machine learning, for example.

For example, the steady-state data of the air flow can be obtained at any time using a recursive neural network. The sampling frequency of the data can be appropriately changed according to the film forming conditions. In this case, if the sampling frequency is increased, more accurate steady-state data of the air flow can be obtained.

The steady-state data of the air flow that is obtained in advance and the steady-state data of the air flow that is obtained at any time by machine learning are stored in the memory part of the controller 6 and can be used in the film forming process described later.

The steady-state data can be used when detecting the presence or absence of the vortex 103.

Figure 4:
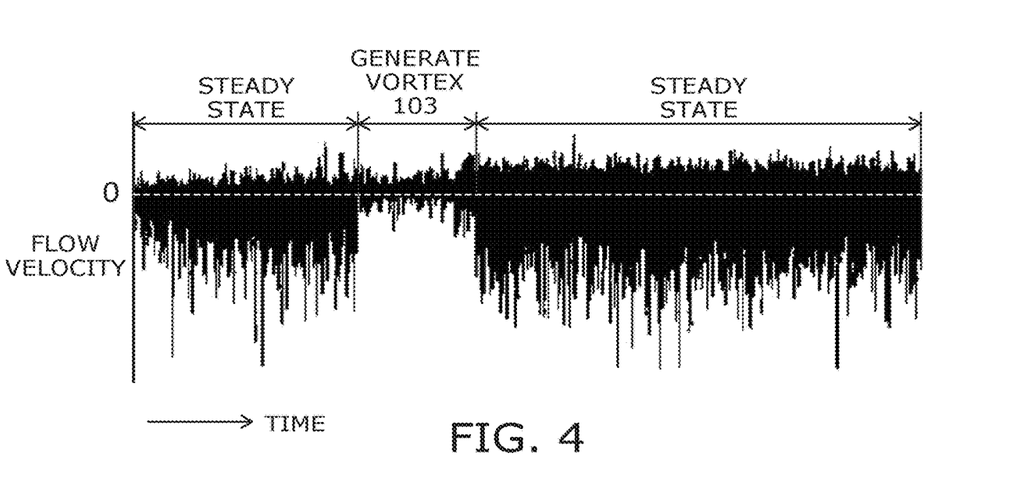
FIG. 4 is a graph view for illustrating detection of vortex generation.

FIG. 4 is a graph view for illustrating detection of generation of vortex 103.

As can be seen from FIG. 4, when the vortex 103 is generated, the flow velocity changes greatly. Therefore, if the flow velocity is continuously measured, it can be determined that the vortex 103 has been generated when the difference between the detected flow velocity and the steady-state flow velocity exceeds a predetermined threshold value. In this case, it is also possible to determine that the vortex 103 has been generated when the detected value exceeds the predetermined threshold value continuously for a predetermined number of times. By doing so, erroneous detection can be suppressed.

Further, as can be seen from FIG. 4, the vortex 103 generated over time may disappear. For example, when the greatly changed flow velocity becomes equal to the steady-state flow velocity, it can be determined that the vortex 103 has disappeared and returned to the steady state. In this case, it is possible to determine that the vortex 103 has disappeared when the flow velocity that is equal to the steady-state flow velocity is continuously generated a predetermined number of times. By doing so, erroneous detection can be suppressed.

In this case, the controller 6 can determine the generation and disappearance of the vortex 103 based on the data regarding the steady state of the air flow stored in the memory part and the detection value from the detector 5.

When the controller 6 determines that the vortex 103 has been generated, it can control the aerosol supplier 4 (supply controller 4b) to stop the supply of the plurality of particles 101. When the supply of the plurality of particles 101 is stopped, only the gas is supplied to the inside of the chamber 2, so that it is possible to suppress the generated vortex 103 to cause an in-plane distribution in the deposition amount of the plurality of particles 101 and hence in the thickness of the formed film.

When the controller 6 determines that the vortex 103 has disappeared, it can control the aerosol supplier 4 (supply controller 4b) to restart the supply of the plurality of particles 101. When the supply of the plurality of particles 101 is restarted, the aerosol 102 is supplied into the chamber 2, so that the plurality of particles 101 can be deposited under a steady-state air flow.

That is, according to the embodiment, it is possible to perform film formation when the air flow is in a steady state, to interrupt film formation when the vortex 103 is generated, and to restart film formation when the generated vortex 103 disappears. By doing so, even if the generation timing of the vortex 103, the generation place of the vortex 103, and the behavior of the generated vortex 103 change irregularly, it is possible to select the time when the air flow is in a steady state to perform film formation. As a result, it is possible to make the deposition amount of the particles 101 uniform, and thus make the thickness of the formed film uniform.

If the detector 5 detects the flow velocity at a plurality of positions, the behavior of particles, and the like, the generation place of the vortex 103 and the behavior of the generated vortex 103 can be known. Therefore, the controller 6 can learn the generation time of the vortex 103, the generation place of the vortex 103, and the behavior of the generated vortex 103 by machine learning, and use the obtained data to predict the vortex 103 to be generated next time.

In this case, the accuracy of prediction can be increased by increasing the sampling frequency. For example, if data is acquired every 0.001 seconds, it is possible to accurately predict the state of the air flow after 0.001 seconds to 0.01 seconds.

If the generated vortex 103 can be predicted, the supply of the plurality of particles 101 can be stopped and the supply of the plurality of particles 101 can be restarted quickly. That is, the responsiveness of control can be improved. Therefore, the thickness of the film can be made more uniform.

As described above, when the controller 6 determines that the vortex 103 has been generated, it stops supplying the plurality of particles 101, but maintains the supply of gas by the gas supplier 4d. In this case, the vortex 103 can be disappeared by stopping the supply of gas by the gas supplier 4d, but it takes a long time from the restart of the supply of gas to the steady state of the air flow. In the embodiment, since the supply of gas is maintained, the film formation can be immediately restarted by restarting the supply of the plurality of particles 101 at the time when the disappearance of the vortex 103 is detected. Therefore, it is possible to alleviate the lengthening of the film formation time by interrupting the film formation.

When the controller 6 determines that the vortex 103 has been generated, it can stop supplying the plurality of particles 101 and control the flow rate controller 4*d*2 to also change the flow velocity of gas. For example, when the vortex 103 can be disappeared by reducing the flow velocity of gas, the controller 6 can control the flow rate controller 4*d*2 to reduce the flow velocity of gas. For example, when the vortex 103 can be disappeared by increasing the flow velocity of gas, the controller 6 can control the flow rate controller 4*d*2 to increase the flow velocity of gas.

That is, when the controller 6 determines that the vortex 103 is generated, the controller 6 controls the aerosol supplier 4 (flow rate controller 4*d*2) to maintain the flow rate of gas or change the flow rate of gas.

The relationship between the flow velocity of gas and the disappearance of the vortex 103 can be known by performing experiments or simulations in advance. Further, the relationship between the flow velocity of gas and the disappearance of the vortex 103 may be acquired at any time by machine learning. The relationship between the flow velocity of gas and the disappearance of the vortex 103, which is obtained in advance, and the relationship between the flow velocity of gas and the disappearance of the vortex 103, which is obtained at any time by machine learning, are stored in the memory part of the controller 6, and can be used in the above-described film formation process.

Next, the operation of the processing system 1 and the processing method and processing program according to the embodiment will be described together with the operation of the processing system 1.

First, the processing object 100 is loaded into the chamber 2 through the loading/unloading port of the chamber 2. The processing object 100 that has been loaded in can be placed on the bottom surface side of the chamber 2. The loading/unloading port of the chamber 2 is closed by a door.

Next, the controller 6 controls the gas supplier 4*d* to supply a gas having a predetermined flow rate to the inside of the chamber 2 via the nozzle 3.

After a predetermined time has elapsed and the state of the gas flow inside the chamber 2 has been stabilized, the controller 6 controls the supply controller 4*b* to supply a predetermined amount of particles 101 to the mixer 4*c*. In the mixer 4*c*, the gas and the plurality of particles 101 are mixed to generate the aerosol 102. The generated aerosol 102 is supplied into the chamber 2 via the nozzle 3.

When the aerosol 102 reaches the surface of the processing object 100 inside the chamber 2, the plurality of particles 101 are deposited on the surface of the processing object 100 and a film is formed.

At this time, the controller 6 monitors the state of the air flow in the vicinity of the region where the processing object 100 is placed, based on the detection value from the detector 5. For example, the controller 6 can detect the generation of the vortex 103 based on the steady state data of the air flow stored in the memory part and the detection value from the detector 5.

When the controller 6 determines that the vortex 103 is generated, the controller 6 controls the supply controller 4*b* to stop the supply of the plurality of particles 101. In this case, the controller 6 can maintain the supply of gas by the gas supplier 4*d*. Further, in order to cause the vortex 103 to disappear, the controller 6 can control the gas supplier 4*d* to also change the flow rate of gas.

When it is determined that the vortex 103 has disappeared, the controller 6 controls the supply controller 4*b* to restart the supply of the plurality of particles 101. When the supply of the plurality of particles 101 is restarted, the aerosol 102 is supplied into the chamber 2, so that the plurality of particles 101 can be deposited under a steady-state air flow.

The control of the generation and disappearance of the vortex 103 and the control of the generation of the aerosol 102 based on the generation and disappearance of the vortex 103 can be performed in the same manner as described above, and thus detailed description thereof will be omitted.

The processing object 100 having a film formed on the surface is unloaded to the outside of the chamber 2 through the loading/unloading port of the chamber 2.

As described above, a film based on the plurality of particles 101 can be formed on the surface of the processing object 100.

As described above, the processing method according to the embodiment can include supplying the plurality of particles 101 and the gas to the processing object 100.

Then, in this step, the state of the air flow in the vicinity of the processing object 100 is detected, and the generation of the vortex 103 is determined based on the data regarding the steady state of the air flow and the detected value of the state of the air flow, and when it is determined that the vortex 103 is generated, the supply of the plurality of particles 101 is stopped.

Further, in this step, the disappearance of the vortex 103 is determined based on the data regarding the steady state of the air flow and the detected value of the state of the air flow, and when it is determined that the vortex 103 has disappeared, the supply of the plurality of particles 101 is restarted.

Further, in this step, when it is determined that the vortex 103 has been generated, the flow rate of gas is maintained or the flow rate of gas is changed.

Further, in this step, at least one of the generation of the vortex 103 and the disappearance of the vortex 103 is predicted using the detected value of the state of the air flow and the prediction model of the recursive neural network.

In addition, in this step, the plurality of particles 101 is deposited on the surface of the processing object 100 to form a film.

Moreover, the processing program according to the embodiment can include following steps.

The aerosol supplier 4 is caused to supply the plurality of particles 101 and the gas to the processing object 100. The detector 5 is caused to detect the state of the air flow in the vicinity of the processing object 100. The arithmetic part 6*a* is caused to determine the generation of the vortex 103 based on the data regarding the steady state of the air flow and the detected value of the state of the air flow. When the arithmetic part 6*a* determines that the vortex 103 has been generated, the supply of the plurality of particles 101 by the aerosol supplier 4 is stopped.

Further, the arithmetic part 6*a* is caused to determine the disappearance of the vortex 103 based on the data regarding the steady state of the air flow and the detected value of the state of the airflow. When the arithmetic part 6*a* determines that the vortex 103 has disappeared, the supply of the plurality of particles 101 by the aerosol supplier 4 is restarted.

When the arithmetic part 6*a* determines that the vortex 103 is generated, the aerosol supplier 4 maintains the flow rate of gas or changes the flow rate of gas.

Using the detected value of the state of the air flow and the prediction model of the recursive neural network, the arithmetic part 6*a* is caused to predict at least one of the generation of the vortex 103 and the disappearance of the vortex 103.

The aerosol supplier 4 is caused to supply the plurality of particles 101 and the gas to deposit the plurality of particles 101 on the surface of the processing object 100 to form a film.

The storage medium according to the embodiment is a computer-readable storage medium. The storage medium stores the processing program described above, and causes the computer (controller 6) to execute following steps when the processing program is executed by the processor.

Causing the aerosol supplier 4 to supply the plurality of particles 101 and the gas to the processing object 100.

Causing the detector 5 to detect the state of the air flow in the vicinity of the processing object 100.

Causing the arithmetic part 6a to determine the generation of the vortex based on the data regarding the steady state of the air flow and the detected value of the state of the air flow.

Causing the aerosol supplier 4 to stop the supply of the plurality of particles 101 when the arithmetic part 6a determines that the vortex has been generated.

The storage medium stores the processing program that causes a computer to further execute following steps.

Causing the arithmetic part 6a to determine the disappearance of the vortex 103 based on the data regarding the steady state of the air flow and the detected value of the state of the air flow.

Causing the aerosol supplier 4 to restart the supply of the plurality of particles 101 when the arithmetic part 6a determines that the vortex 103 has disappeared.

The storage medium stores the processing program that causes a computer to further execute a following step.

Causing the aerosol supplier 4 to maintain the flow rate of gas or changing the flow rate of gas when the arithmetic part 6a determines that the vortex 103 is generated.

The storage medium stores the processing program that causes a computer to further execute a following step.

Causing the arithmetic part 6a to predict at least one of the generation of the vortex 103 and the disappearance of the vortex 103 by using the detected value of the state of the air flow and the prediction model of the recursive neural network.

The storage medium stores the processing program that causes a computer to further execute a following step.

Causing the aerosol supplier 4 to supply the plurality of particles 101 and the gas to perform film formation by depositing the plurality of particles 101 on the surface of the processing object 100.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A processing system, comprising:
   a chamber configured to store a processing object inside;
   a supplier configured to supply a plurality of particles and a gas inside the chamber;
   a flow velocity meter configured to detect a flow velocity value and flow direction of the gas including the plurality of particles in a vicinity of the processing object; and
   a controller configured to control the supplier based on a detection value from the flow velocity meter,
   the controller is configured to:
   determine a generation of a vortex based on flow velocity value and flow direction of the gas including the plurality of particles from the flow velocity meter and predetermine a steady state of flow velocity value and flow direction of the gas including the plurality of particles, and
   control the supplier to stop supply of the plurality of particles when the generation of the vortex is determined.

2. The system according to claim 1, wherein
   the controller is further configured to:
   determine a disappearance of the vortex based on flow velocity value and flow direction of the gas including the plurality of particles from the flow velocity meter and predetermined steady state of flow velocity value and flow direction of the gas including the plurality of particles, and
   control the supplier to restart the supply of the plurality of particles when the disappearance of the vortex is determined.

3. The system according to claim 1, wherein
   the controller controls the supplier to maintain a flow rate of the gas or change the flow rate of the gas when the generation of the vortex is determined.

4. The system according to claim 1, wherein
   the controller is configured to predict at least one of the generation of the vortex or the disappearance of the vortex by using flow velocity value and flow direction of the gas from the flow velocity meter and a prediction model of a recursive neural network.

5. The system according to claim 1, wherein
   the controller controls the supplier to perform film formation by depositing the plurality of particles on a surface of the processing object.

6. The system according to claim 1, wherein
   the supplier is configured to generate an aerosol from the plurality of particles and the gas.

7. The system according to claim 6, wherein
   the supplier is configured to supply the aerosol to inside of the chamber.

8. The system according to claim 1, wherein
   the plurality of particles is at least one of solid particles or liquid particles.

9. The system according to claim 1, wherein
   the flow velocity meter is configured to detect at least one of a flow velocity value and flow direction of the gas or behavior of the plurality of particles included in the gas.

10. The system according to claim 1, wherein
    an appearance shape of the chamber is substantially a truncated cone.

11. A processing method, comprising:
    supplying a plurality of particles and a gas to a processing object,
    in the supplying, the method including
    detecting a flow velocity value and flow direction of the gas including the plurality of particles in a vicinity of the processing object,
    determining generation of a vortex based on flow velocity value and flow direction of the gas including the plurality of particles and predetermine a steady state of flow velocity value and flow direction of the gas including the plurality of particles, and
    stopping supply of the plurality of particles when the generation of the vortex is determined.

12. The method according to claim 11, wherein in the supplying, the method includes determining disappearance of the vortex based on flow velocity value and flow direction of the gas including the plurality of particles and predetermined steady state of flow velocity value and flow direction of the gas including the plurality of particles, and restarting the supply of the plurality of particles when the disappearance of the vortex is determined.

13. The method according to claim 11, wherein in the supplying, the method includes maintaining a flow rate of the gas or changing the flow rate of the gas when the generation of the vortex is determined.

14. The method according to claim 11, wherein in the supplying, the method includes predicting at least one of the generation of the vortex or the disappearance of the vortex by using flow velocity value and flow direction of the gas and a prediction model of a recursive neural network.

15. The method according to claim 11, wherein in the supplying, the method includes performing film formation by depositing the plurality of particles on a surface of the processing particles.

16. A storage medium configured to be a computer-readable storage medium, the storage medium storing a program, the storage medium causing the computer to execute following steps when the program is executed by a processor, causing a supplier to supply a plurality of particles and a gas to a processing object, causing a flow velocity meter to detect flow velocity value and flow direction of the gas including the plurality of particles in a vicinity of the processing object, causing an arithmetic part to determine generation of a vortex based on flow velocity value and flow direction of the gas including the plurality of particles from the flow velocity meter and predetermine a steady state of flow velocity value and flow direction of the gas including the plurality of particles, and causing the supplier to stop the supply of the plurality of particles when the arithmetic part determines that the vortex is generated.

17. The medium according to claim 16, the medium storing the program causing the computer to further execute following steps, causing the arithmetic part to determine disappearance of the vortex based on flow velocity value and flow direction of the gas including the plurality of particles from the flow velocity meter and predetermined steady state of flow velocity value and flow direction of the gas including the plurality of particles, causing the supplier to restart the supply of the plurality of particles when the arithmetic part determines that the vortex is disappeared.

18. The medium according to claim 16, the medium storing the program causing the computer to further execute a following step, causing the supplier to maintain a flow rate of the gas or change the flow rate of the gas when the arithmetic part determines that the vortex is generated.

19. The medium according to claim 16, the medium storing the program causing the computer to further execute a following step, causing the arithmetic part to predict at least one of the generation of the vortex or disappearance of the vortex by using flow velocity value and flow direction of the gas and a prediction model of a recursive neural network.

20. The medium according to claim 16, the medium storing the program causing the computer to further execute a following step, causing the supplier to supply the plurality of particles and the gas to perform film formation by depositing the plurality of particles on a surface of the processing object.

* * * * *